(12) United States Patent
Wezelenburg

(10) Patent No.: US 7,814,297 B2
(45) Date of Patent: Oct. 12, 2010

(54) ALGEBRAIC SINGLE INSTRUCTION MULTIPLE DATA PROCESSING

(75) Inventor: Martinus Cornelis Wezelenburg, Leuven (BE)

(73) Assignee: ARM Limited, Cambridge (GB)

( * ) Notice: Subject to any disclaimer, the term of this patent is extended or adjusted under 35 U.S.C. 154(b) by 1456 days.

(21) Appl. No.: 11/189,021

(22) Filed: Jul. 26, 2005

(65) Prior Publication Data
US 2007/0028076 A1 Feb. 1, 2007

(51) Int. Cl.
*G06F 9/00* (2006.01)
(52) U.S. Cl. .......................... 712/22; 712/220
(58) Field of Classification Search .................... 712/22
See application file for complete search history.

(56) References Cited

U.S. PATENT DOCUMENTS

| | | | |
|---|---|---|---|
| 5,099,448 A | | 3/1992 | Myers et al. |
| 5,175,862 A | | 12/1992 | Phelps et al. |
| 5,319,586 A | | 6/1994 | Gupta et al. |
| 6,397,235 B1 * | | 5/2002 | Van Eijndhoven et al. .. 708/401 |
| 6,944,747 B2 * | | 9/2005 | Nair et al. ..................... 712/35 |

* cited by examiner

*Primary Examiner*—Alford W Kindred
*Assistant Examiner*—Benjamin P Geib
(74) *Attorney, Agent, or Firm*—Nixon & Vanderhye P.C.

(57) ABSTRACT

A data processing apparatus comprises data processing logic operable to perform data processing operations specified by program instructions. The data processing logic (140) has a plurality of functional units (142, 144, 146) configured to execute in parallel on data received from a data source. A decoder (130) is responsive to a single program instruction to control the data processing logic (140) to concurrently execute the single program instruction on each of a plurality of vector elements of each of a respective plurality of vector input operands (310, 320) received from the data source using the plurality of functional units (142, 144, 146). During execution of the single program instruction, the plurality of functional units (142, 144, 146) operate as a predetermined group on said plurality of vector elements (310, 320) to perform at least a matrix-vector calculation in which the matrix is a non-identity matrix and entries of the matrix are one of:
(i) populated in dependence upon at least one of said vector elements of at least one of the plurality of vector input operands; and
(ii) generated within said data processing logic as an explicit function of the single program instruction.

28 Claims, 9 Drawing Sheets

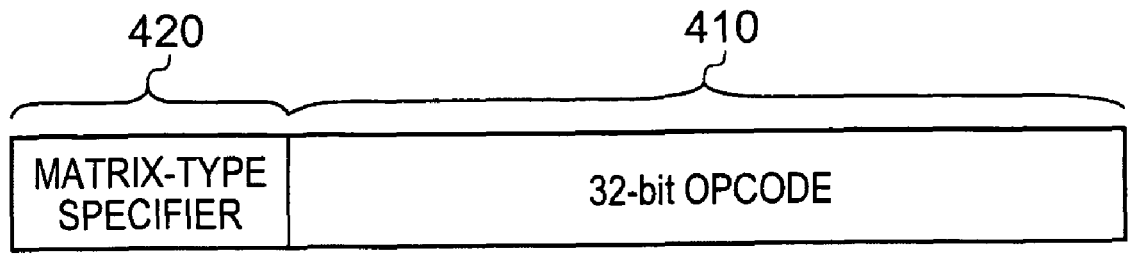
Fig. 4A
functionA(a, b)
Fig. 4B
functionB(matrixN, a, b)
Fig. 4C
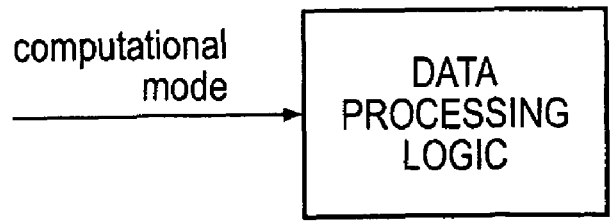
Fig. 4D

1D-negacyclic convolution

2D-modified negacyclic convolution $a_0 = a_{00}$
$a_1 = a_{01}$
$a_2 = a_{10}$
$a_3 = a_{11}$

ALGEBRAIC SINGLE INSTRUCTION MULTIPLE DATA PROCESSING

BACKGROUND OF THE INVENTION

1. Field of the Invention

The present invention relates to the field of data processing systems. More particularly, this invention relates to a data processing system in which it is desired to provide single instruction multiple data (SIMD) type operation.

2. Description of the Prior Art

Single instruction multiple data (SIMD) operation is a known technique whereby data words being manipulated in accordance with a single instruction in fact represent multiple data values within those data words with the manipulation specified being independently performed upon respective data values. This type of instruction can increase the efficiency with which a data processing system operates and is particularly useful in reducing code size and speeding up processing operation. The technique is commonly, but not exclusively, applied to the field of manipulating data values representing physical signals, such as in digital signal processing applications. A drawback of this approach is that the operations take place in parallel on independent data-sets, and that special provisions must be made to combine those data-sets, thereby reducing the efficiency, and increasing the complexity.

An alternative method to increase the parallel computation capability is simply by adding more functional units to perform the computations. Yet, when extending the data processing capabilities of a data processing system, an important consideration is the extent of any size, complexity, cost and power consumption overheads that may be introduced to support the additional processing capabilities. Although it is desirable to achieve a high effective level of instruction execution parallelism in data processing systems, the need for many additional control bits to control movement of data between a data store (such as a register file) and data processing logic can be detrimental to the efficiency of the data processor. Constraints can be imposed on data movements to and from data storage locations to counter the increase in control complexity. However, these constraints have adverse effects on both compiler and effective computational performance that typically offset the advantages theoretically achievable by introducing the instruction execution parallelism.

SUMMARY OF THE INVENTION

Viewed from one aspect, the present invention provides a data processing apparatus comprising:

data processing logic operable to perform data processing operations specified by program instructions, said data processing logic comprising a plurality of functional units configured to execute in parallel, said data processing operations being performed on data received from a data source;

a decoder responsive to a single program instruction to control said data processing logic to concurrently execute said single program instruction on each of a plurality of vector elements of each of a respective plurality of vector input operands received from said data source using said plurality of functional units;

wherein during execution of said single program instruction, said plurality of functional units operate as a predetermined group on said plurality of vector elements to perform at least a matrix-vector calculation in which said matrix is a non-identity matrix and entries of said matrix are one of:

(i) populated in dependence upon at least one of said vector elements of at least one of said plurality of vector input operands; and (ii) generated within said data processing logic as an explicit function of said single program instruction.

The present invention recognises that the degree of instruction level parallelism can be enhanced without any requirement for a large number of additional control bits to control movement of data between the data store and respective ones of the plurality of functional units and without adversely affecting either compiler performance by imposing constraints on interconnections between respective data inputs to and data outputs from the plurality of functional units, or flexibility with respect to the data-sets operated on, as is the case with known SIMD techniques. This is achieved by constraining the plurality of functional units to act as a predetermined group on the plurality of vector input elements rather than constraining inter-connections between in-ports and out-ports of the plurality of functional units and particular fields within a data store such as a register file.

By executing a single program instruction on each of a plurality of vector elements of each of a respective plurality of vector input operands and causing the functional units to operate as predetermined groups on the vector input operands, the efficiency of the instruction execution can be increased. A single program instruction operates on a multi-element vector rather than a scalar and the operations specified by the single program instruction correspond to a predetermined group of operators, where each of the multi-element vector data is treated as a number in an algebraic system. Each operator on at least one input operand is to be regarded as an overloaded version of the corresponding scalar operator, rather than a repetitive application of the scalar operator on each of the individual elements of the vector input. Consequently the achievable level of parallelism grows quadratically with the vector length instead of linearly.

It will be appreciated that the total volume of data to be processed by the data processing apparatus depends upon the particular algorithm being executed. The matrix-vector calculation according to the present technique enables the systematic representation of a data-set of a total size N to be represented in physical memory as a matrix[depth][width]= [N/M][M], thus a number of N/M vectors with M elements each, whereas the known techniques correspond to a physical memory representation of a matrix[depth][width]=[N][1], a scalar array. Thus the present technique allows for an implementation deploying wider and less deep memories, which are more power efficient.

The structural simplicity of the data processing apparatus according to the present technique makes it practical to employ a register file topology in which the interconnections between the functional units and a data store such as a register file are relatively unconstrained. This register file topology would typically not be practical in known systems due to the large number of control bits that would be required to specify the required connections. Unconstrained register file topologies offer advantages because they allow for high-radix processing. High-radix processing benefits from a topology where all of the register fields are available at the inputs of the functional units. Accordingly, in a data processing system having many registers, any interconnection constraints whereby data storage locations within the registers are allocated to particular in-ports or out-ports of a particular ALU precludes effective performance of high-radix processing. The present invention thus makes such an unconstrained topology feasible by constraining the functional units of the data processing logic to operate in predetermined groups rather than by constraining movements of data between particular locations in the data store and particular functional units. Thus the present invention allows computational algorithms to be programmed in a higher-radix form. This property reduces the number of elementary operations that need to be performed e.g. loads, stores, multiplies and additions, which means that the algorithms can be made more compact.

In one embodiment the non-identity matrix is populated in dependence upon at least one and at most two of the plurality of vector input operands. This enables the calculation to be efficiently performed and reduces data transport overheads and state maintenance requirements in the plurality of functional units.

In one embodiment the non-identity matrix is one of a permutation matrix, a circulant matrix or a Toeplitz matrix. This enables a high level of instruction execution parallelism to be achieved efficiently in many common data processing applications, such as digital filtering, where convolutions and correlations are performed.

In one embodiment the non-identity matrix is either a circulant matrix or a Toeplitz matrix and entries of the non-identity matrix are populated in dependence upon at least one of the vector elements of at least one of said plurality of vector input operands.

In one embodiment the non-identity matrix is associated with a polynomial product operation and the vector elements of the vector input operands correspond to polynomial coefficients of polynomials of the polynomial product operation.

In one embodiment the non-identity matrix is associated with a polynomial product operation modulo a non-constant polynomial and wherein the vector elements of the vector input operands correspond to coefficients of polynomials of the polynomial product and the non-constant polynomial is dependent upon the single program instruction.

In one embodiment the vector elements of the vector input operands are partitions of a representation in which a data word comprising a plurality of digits is represented by a vector input operand such that the plurality of digits are partitioned into at least two subsets corresponding to respective vector elements of the vector input operand. This enables multi-precision data words to be conveniently represented in vector form and thus enables multi-precision computations to be efficiently performed. The partitions of one embodiment are partitions of a multi-dimensional representation. In an alternative embodiment the partitions are partitions of a multi-precision representation.

In one embodiment the non-identity matrix is constructed using Kronecker product rules such that it comprises a plurality of sub-matrices associated with a respective plurality of inner products.

In one embodiment the vector input operands are addressed using scalar addresses and the vector input operands are transported within the data processing apparatus as complete entities. By widening the data-path in this way additional bandwidth is achieved without compromising the structural simplicity of the system. Therefore, the complexity of address calculation is reduced compared to known unconstrained parallel systems where an address would have to be calculated for each scalar input/output value. Since the plurality of functional units perform a matrix-vector calculation in which the matrix is populated in dependence upon either at least one vector input operand or a program instruction, the calculation can be performed efficiently without movement of many vectors.

In one embodiment the non-identity matrix is a permutation matrix and entries of the non-identity matrix are generated within the data processing logic in dependence upon an explicit function of the single program instruction.

In one embodiment the non-identity matrix has an associated matrix type that is specified implicitly by the single program instruction, the program instruction itself specifying the associated matrix type. This enables the required matrix-vector calculation to be conveniently fixed as appropriate for the particular processing operation. In an alternative embodiment, the associated matrix type is specified explicitly as an input argument of the single program instruction. This offers more flexibility to the programmer to change the matrix type associated with the particular program instruction.

In an alternative embodiment the non-identity matrix has an associated matrix type specified in hardware by a currently-set programmable mode of operation of the data processing logic. This simplifies the program code and exploits the fact that a plurality of data processing operations that make use of a given matrix type for execution of the associated program instruction are likely to be performed in succession. Thus, use of the programmable mode to set the matrix type reduces the burden of repeatedly resetting the matrix type upon execution of each program instruction.

In a further alternative embodiment the non-identity matrix has an associated matrix type that is specified by a dedicated field in a machine-level version of the single program instruction.

In one embodiment the non-identity matrix is either an aperiodic convolution matrix or an asymmetric Toeplitz matrix and the single program instruction to be executed is one of a sequence of program instructions of an iterative computation. In this particular example embodiment, the data processing logic comprises memory operable to store state information associated with at least one of the sequence of program instructions of the iterative computation. The stored state information can thus be used for execution of the single program instruction in a subsequent iteration of the iterative computation. Use of the stored state information enables the iterative computation to be performed more efficiently since a greater effective number of stages of the computation can be performed per program loop. In one such embodiment, entries of the aperiodic convolution matrix or elements of said asymmetric Toeplitz matrix are populated in dependence upon at least one of said vector elements of at least one of the plurality of vector input operands.

In one embodiment, the non-identity matrix is an element-wise product of a Toeplitz matrix and a sign matrix. In this one embodiment the entries of the matrix are populated in dependence upon at least one of said vector elements of at least one of said plurality of vector input operands.

In an alternative embodiment, the non-identity matrix is an element-wise product of a permutation matrix and a sign matrix. Entries of this matrix are generated within the data processing logic as an explicit function of the single program instruction.

In one embodiment the non-identity matrix is a Toeplitz matrix and the Toeplitz matrix is one of an aperiodic convolution matrix or a negacyclic convolution matrix. In an alternative embodiment the non-identity matrix is a circulant matrix and the circulant matrix is one of a periodic convolution matrix or a cyclic convolution matrix.

It will be appreciated that the data source could be any one of a number of possible sources such as a received data stream generated by a peripheral device or data read from system memory. However, in one embodiment the data source is a register file and said plurality of vector input operands are read from respective locations in said register file.

Viewed from another aspect, the present invention provides a data processing method, said method comprising the steps of:

performing data processing operations specified by program instructions using data processing logic comprising a plurality of functional units configured to execute in parallel, said data processing operations being performed on data received from a data source;

controlling said data processing logic using a decoder responsive to a single program instruction to concurrently execute said single program instruction on each of a plurality of vector elements of each of a respective plurality of vector input operands received from said data source using said plurality of functional units;

using said plurality of functional units to operate as a predetermined group on said plurality of vector elements during execution of said single program instruction to perform at least a matrix-vector calculation in which said matrix is a non-identity matrix and entries of said matrix are one of:

(i) populated in dependence upon at least one of said vector elements of at least one of said plurality of vector input operands; and (ii) generated within said data processing logic as an explicit function of said single program instruction.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 4A, B, C and D schematically illustrate alternative ways in which a matrix population pattern of the matrix-vector multiplication according to the present technique can be specified;

DESCRIPTION OF THE PREFERRED EMBODIMENTS

Figure 1:
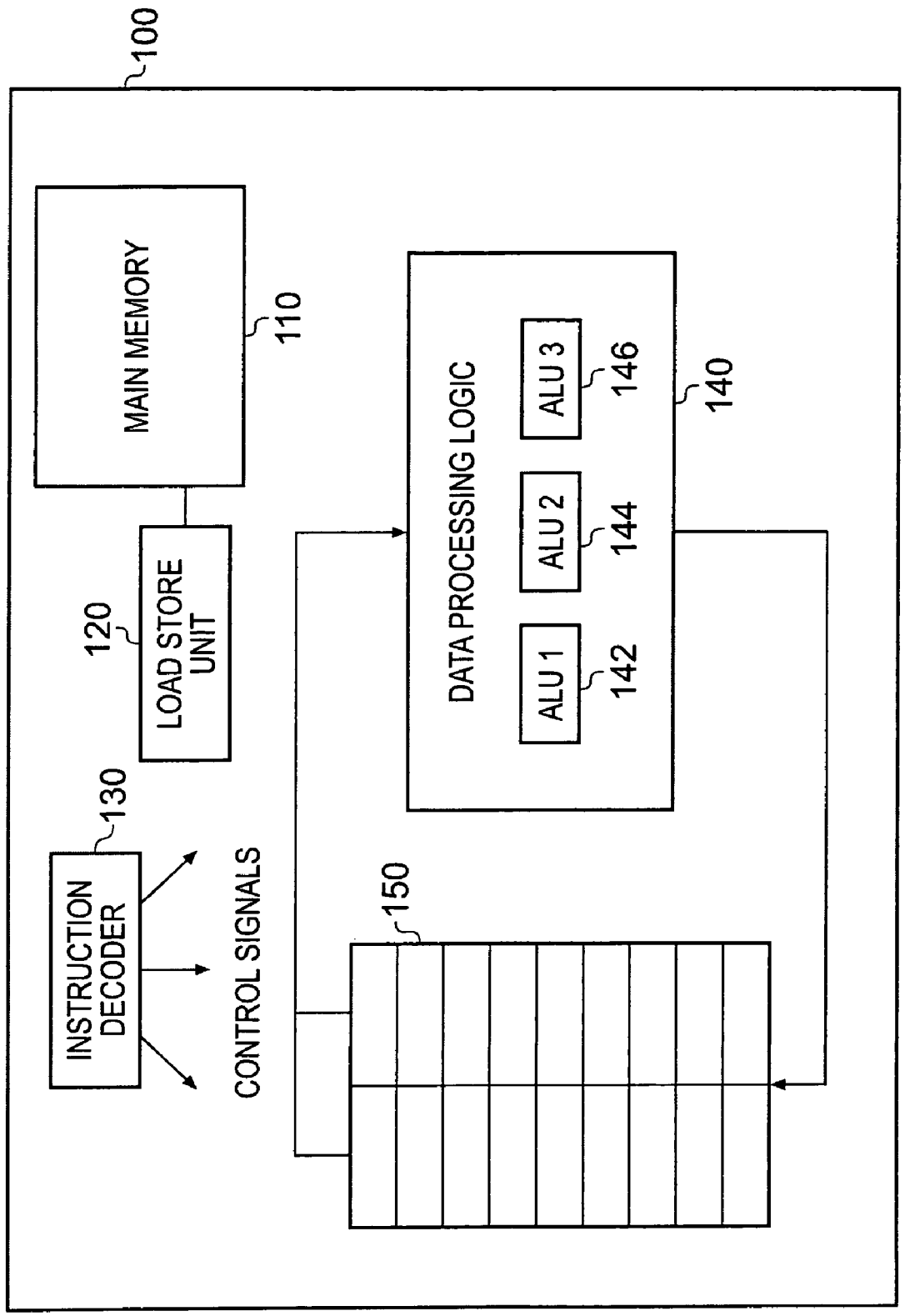
FIG. 1 schematically illustrates a data processing apparatus.

FIG. 1 schematically illustrates a data processing apparatus 100 according to the present technique. The arrangement comprises a main memory 110, a load store unit 120, an instruction decoder 130, data processing logic 140 having three functional units 142, 144, 146 and a register file 150.

The load store unit 120 is operable to load a program instruction from main memory 110. The program instruction is supplied to the instruction decoder 130, which decodes the program instruction and outputs a plurality of control signals to control the data processing apparatus to perform a processing operation in dependence upon the program instruction. The control signals from the instruction decoder 130 control the three functional units 142, 144, 146 to perform operations such as adds, multiplies and shifts to vector input operands that are read from the register file 150. Output values representing the results of the operations performed by the data processing logic can be written back to the register file 150. In alternative arrangements, the vector input operands that are acted on by the data processing logic 140 in response to the control signals from the instruction decoder 130 are received by the data processing apparatus as an input data stream from a data source. During execution of a single program instruction word, the three functional units 142, 144, 146 operate as a predetermined group on each element of a plurality of vector input operands. The data processing logic 140 performs at least a matrix-vector calculation, in which entries of the matrix, which is a non-identity matrix, are either (i) populated in dependence upon at least one of the vector elements of at least one of the plurality of vector input operands; or (ii) generated within the data processing logic as an explicit function of the single program instruction.

Figure 2B:
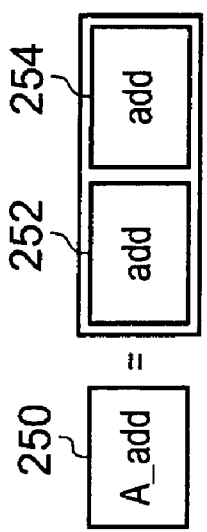
FIG. 2B schematically illustrates a group of Scalar operators that comprises an algebraic single instruction multiple data (ASIMD) add unit.
Figure 2C:
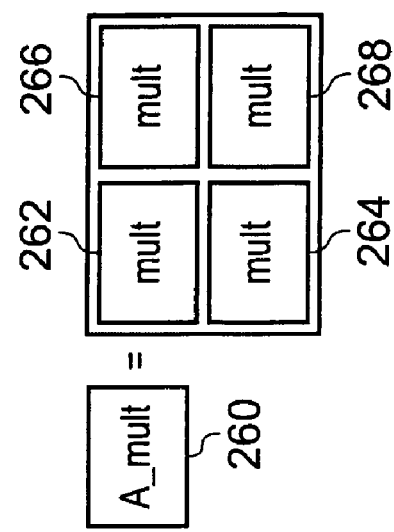
FIG. 2C schematically illustrates a group of Scalar operators that comprises an ASIMD multiply unit.
Figure 2A:
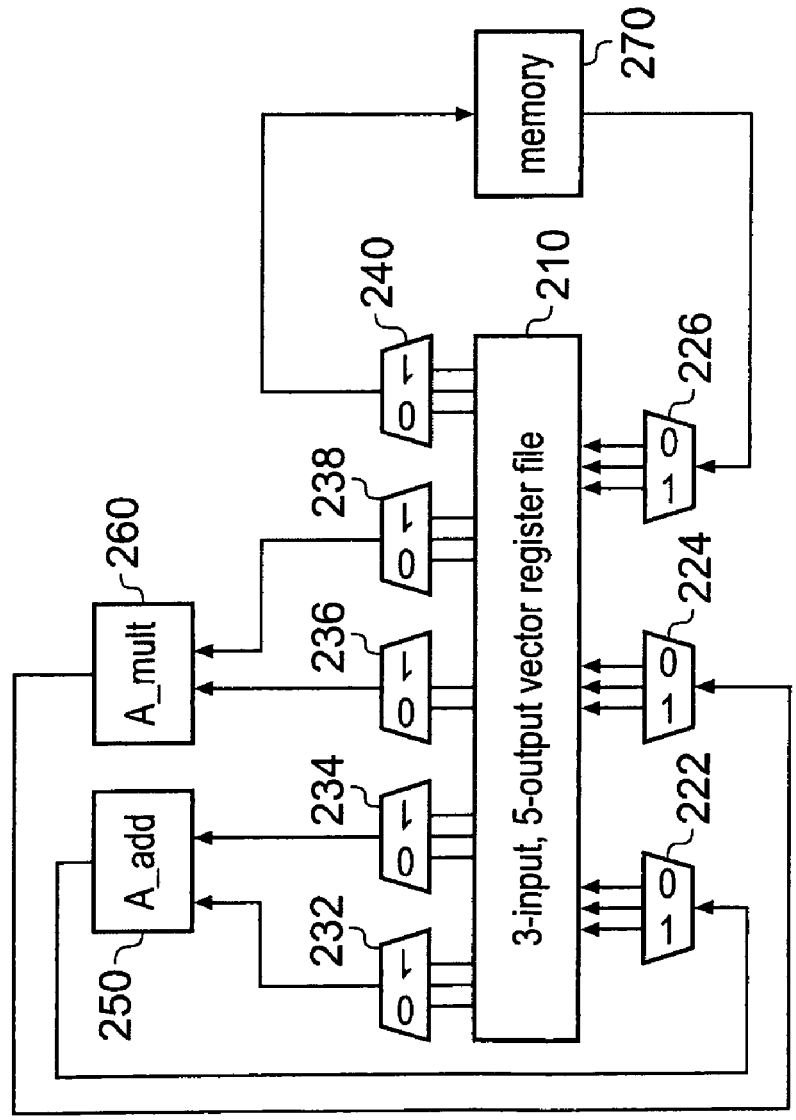
FIG. 2A schematically illustrates a load-store data path configuration according to the present technique.

FIG. 2A schematically illustrates a load-store data path configuration according to the present technique. The configuration comprises: a central vector register file 210; three register input multiplexers 222, 224, 226; five register output multiplexers 232, 234, 236, 238, 240; an algebraic single instruction multiple data (ASIMD) addition unit 250; an ASIMD multiply unit 260 and a memory 270.

The load-store architecture of FIG. 2A allows for parallel processing since the ASIMD add unit 250 and the ASIMD multiply unit 260 are configured to perform calculations in parallel on vector input operands read from the central vector register file 210. From the central vector register file 210, the following operations can be simultaneously performed: (i) two vector input operands can be supplied to the ASIMD add unit 250 via the multiplexers 232 and 234; (ii) two vector input operands can be supplied to the ASIMD multiply unit 260; and (iii) one vector value can be written back to the memory 270. Furthermore, considering writes to the central vector register file 210, the following operations can be simultaneously performed: (i) a result output by the ASIMD add unit 250 can be written via register input multiplexer 222; (ii) a result output by the ASIMD multiply unit 260 can be written via register input multiplexer 224; and (iii) a value from memory 270 can be written to the register 210 via register input multiplexer 226.

This load-store architecture allows for powerful parallel processing because there are no constraints on data movements or data storage locations within the central vector register file 210. A number of control bits are required to control registers that select data storage fields within the central vector register file 210 for use by each of the five central register output ports and three central register input ports. The number of vector input ports 222, 224, 226 and vector output ports 232, 234, 236, 238, 240 of the central vector register file 210 is reduced relative to a corresponding load-store configuration that uses at least one or at most as many SCALAR units as the arrangement according to the present technique. The manner in which the ASIMD add unit 250 and the ASIMD multiply unit 260 are constructed is such that they represent predetermined groups of basic SCALAR operator units, as appropriate for acting on each element of a plurality of vector input operands rather than scalar input operands.

FIG. 2B schematically illustrates a combination of basic SCALAR add operators that comprises the ASIMD add unit 250, which is operable to perform the following calculation:

$$y = \begin{pmatrix} a0 \\ a1 \end{pmatrix} + \begin{pmatrix} 1 & 0 \\ 0 & 1 \end{pmatrix} * \begin{pmatrix} b0 \\ b1 \end{pmatrix} = \begin{pmatrix} a0 + b0 \\ a1 + b1 \end{pmatrix} \quad \text{eqn. 1}$$

The ASIMD add unit 250 thus comprises a combination of two basic SCALAR add units 252, 254, which operate on the vector input operand (a0, a1) and the matrix-vector product of an identity matrix and the vector input operand (b0, b1).

FIG. 2C schematically illustrates the combination of basic SCALAR multiply operators comprising the ASIMD multiply unit 260. This unit 260 is operable to perform a complex multiply calculation on the complex input vector operands (a0, a1) and (b0, b1), where a0 and b0 are vector elements representing the real parts of complex numbers "a" and "b" respectively and a1 and b1 represent the corresponding imaginary parts.

$$y = (a0 + ja1) * (b0 + jb1) \quad \text{eqn. 2a}$$

$$= \begin{pmatrix} a0 & -a1 \\ a1 & a0 \end{pmatrix} * \begin{pmatrix} b0 \\ b1 \end{pmatrix}$$

$$= \begin{pmatrix} a0*b0 - a1*b1 \\ a1*b0 + a0*b1 \end{pmatrix}$$

This complex multiply operation thus requires a combination of four basic SCALAR multiply operators 262, 264, 266, 268 in order to perform the matrix-vector multiply.

The complex multiply of eqn. 2a can be alternatively represented as the multiplication of two first-order polynomials a(z) and b(z) modulo $z^2+1$ as follows (where $z^2 = -1$): eqn. 2b $$(a1*z + a0)*(b1*z + b0) \text{ modulo } (z^2 + 1)$$
$$= a1*b1*z^2 +$$
$$(a1*b0 + a0*b1)z +$$
$$a0*b0$$
$$= (a1*b0 + a0*b1)z +$$
$$(a0*b0 - a1*b1)$$

In the arrangement of FIG. 2A, the ASIMD operator units 250, 260, the central vector register file 210, the register input multiplexers 222, 224, 226, the register output multiplexers 232, 234, 236, 238, 240, the memory 270 and buses that connect these components handle data in the form of vectors. By way of contrast, in known SIMD systems data is typically handled in the form of scalars. By transporting vectors rather than scalars in the architecture of FIG. 2A, the data bandwidth is increased, since instead of generating an address for each scalar value, a single address is generated in association with each vector, the vector comprising at least two elements. It will be appreciated that this also reduces the complexity of the address calculation.

The ASIMD add unit 250 and the ASIMD multiply unit 260 are formed from predetermined groups of basic scalar operators, which act on vector input operands rather than scalar input operands. The degree of interconnect parallelism is reduced relative to a system that is configured to use a plurality of independent basic scalar operators to perform processing on scalar input operands. The composite structure of the ASIMD operators 250, 260 reduces the instruction length and thus program size for a given processing algorithm. This reduction in program size is achieved without either: (i) applying hierarchy in the central vector register file 210 to create distinct input, output and accumulator register files; or (ii) dedicating certain fields in the central vector register file 210 to certain register input ports. Thus, the penalties in terms of compiler performance associated with imposing constraints on data movements to/from the central vector register file 210 are ameliorated by constraining the use of the basic scalar operators as illustrated in FIGS. 2B and 2C and by performing operations on vector input operands rather than scalar input operands.

There follows below a first example of code representing a multiply-accumulate operation.

Simple Code:

```
For(i=0;i<I;i++)
{
    Acc=0;
    For (j=0;j<J;j++)
        Acc += x[i]*y[i+j];
    Z[i] = Acc;
}
```

Since only a single product of the accumulation is calculated per loop iteration, this code is bandwidth limited. The following second example code for a multiply-accumulate operation calculates four different products of the accumulation per loop.

```
For(i=0;i<I;i+=2)
{
    Acc0=0;
    Acc1=0;
    For (j=0;j<J;j+=2)
    {
        Acc0 += x[i]*y[i+j];
        Acc0 += x[i+1]*y[i+1+j];
        Acc1 += x[i+1]*y[i+j];
        Acc1 += x[i+2]*y[i+1+j];
    }
    Z[i] = Acc0;
    Z[i+1] = Acc1;
}
```

The shift-register characteristic of this second example code allows for the re-use of data, and thus balances bandwidth and arithmetic operations. However, in this case the increase in bandwidth is at the expense of least a four times larger code size.

There follows below a third example of code representing a multiply-accumulate operation. This third example is an example of program code according to the present technique and closely reflects the structure of the first example code above.

```
For(i=0;i<I;i++)        {
    Acc=ASIMD_MULT(x[i],y[i]);
    For (j=1;j<J;j++)
        Acc = ASIMD_MAC(Acc x[i],y[i+j]);
    Z[i] = Acc;
}
```

In the code of this third example, the indices i and j steps a two-element vector on each iteration of the loop. The accumulation is performed using a composite ASIMD multiply program instruction that receives the vector input operands x[i] and y[i] as arguments and executes a single program instruction using a predetermined group of basic Scalar operators. The ASIMD program instructions are in this case defined as follows:

ASIMD_MULT(x, y):

$$\begin{bmatrix} acc_0 \\ acc_1 \end{bmatrix} = \begin{bmatrix} x_i & x_{i+1} \\ 0 & x_i \end{bmatrix} \cdot \begin{bmatrix} y_{i+j} \\ y_{i+j+1} \end{bmatrix}$$

Figure 7:
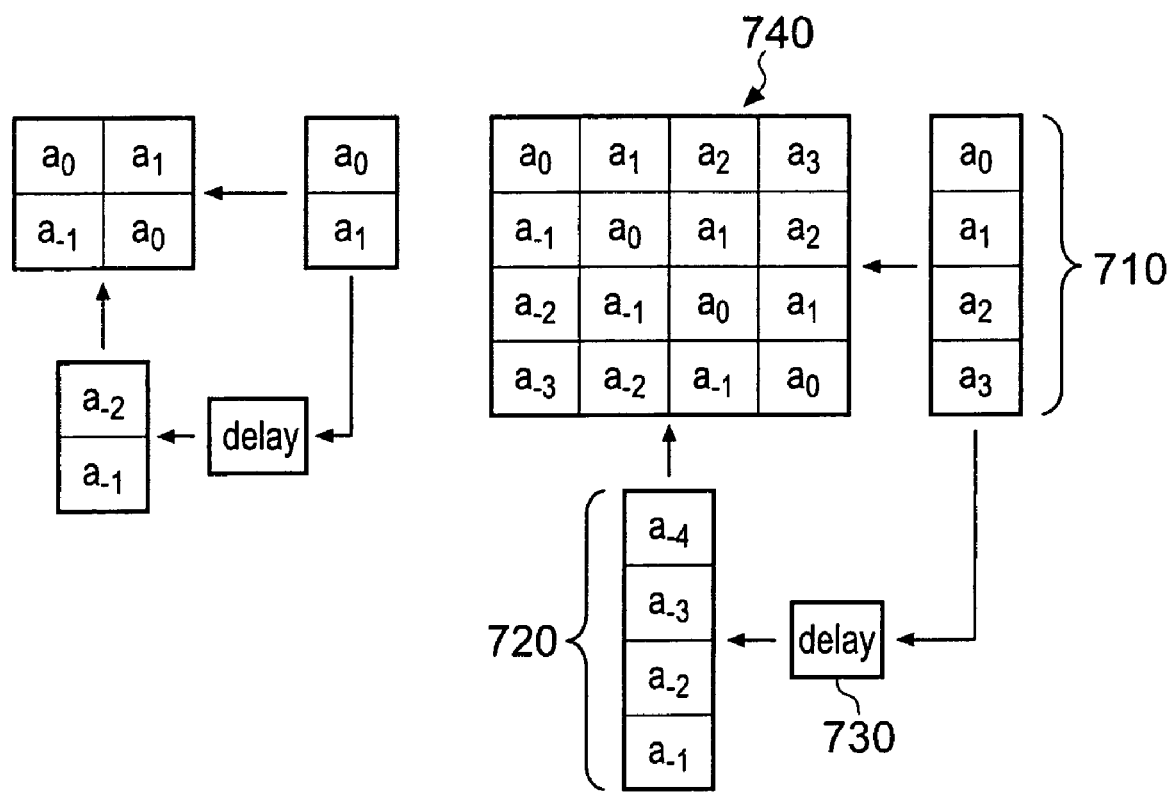
FIG. 7 schematically illustrates two examples of construction of a 1D aperiodic convolution matrix from a single input vector and a single (partially) stored vector each containing two respectively four elements.

ASIMD_MAC(acc, x, y):

$$\begin{bmatrix} acc_0 \\ acc_1 \end{bmatrix} = \begin{bmatrix} acc_0 \\ acc_1 \end{bmatrix} + \begin{bmatrix} x_i & x_{i+1} \\ x_{i-1} & x_i \end{bmatrix} \cdot \begin{bmatrix} y_{i+j} \\ y_{i+j+1} \end{bmatrix}$$

Where $x_{i-1}$ is a previous shift-register value, which is loaded as a side effect of execution of the ASIMD_MULT( ) program instruction, and updated with each execution of the ASIMD_MAC( ) program instruction. FIG. 7 below illustrates a computation in which the previous shift-register value is updated with each execution.

Figure 3:
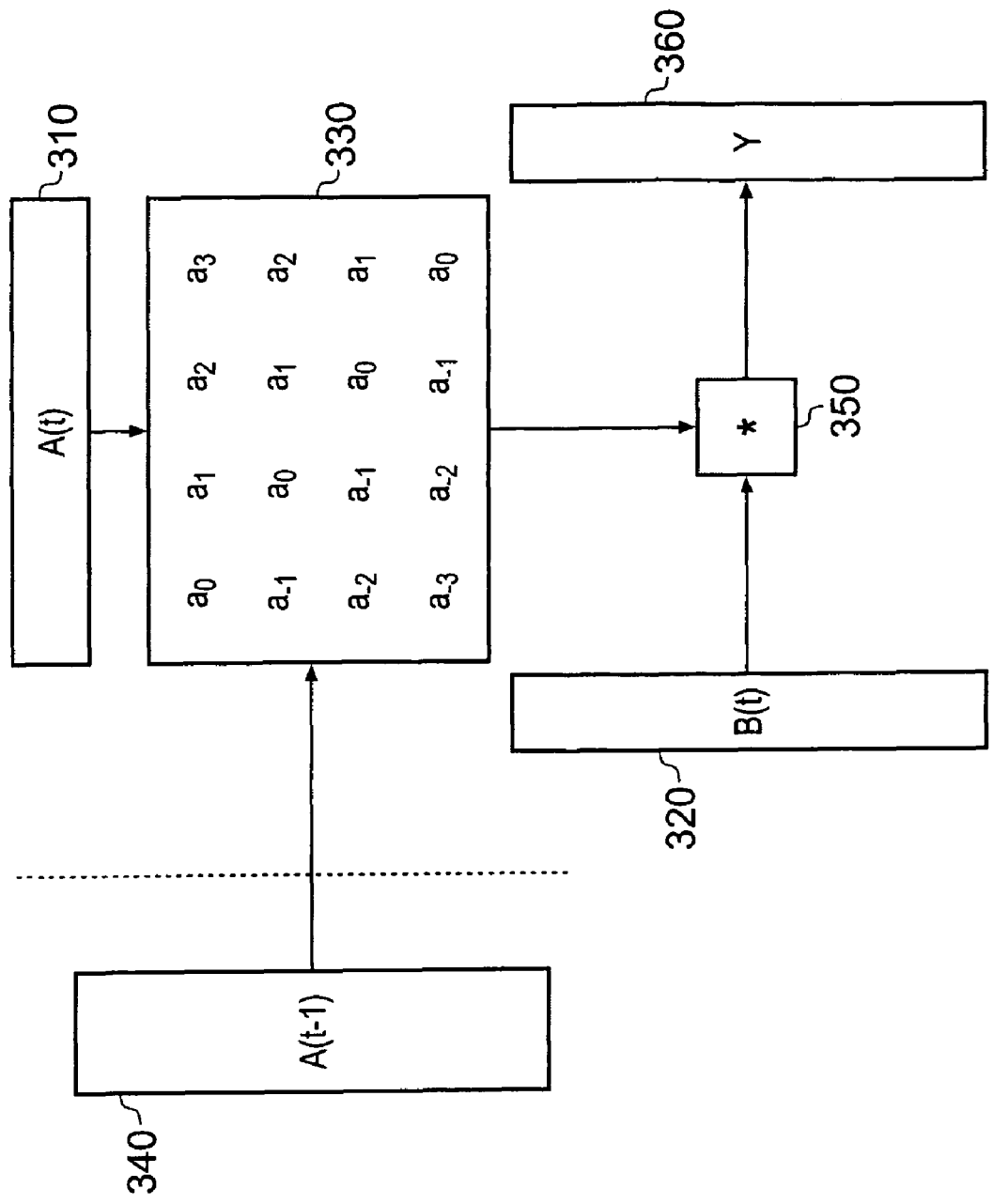
FIG. 3 schematically illustrates execution of a program instruction on vector input operands using a plurality of functional units as a predetermined group.

FIG. 3 schematically illustrates execution of a program instruction on vector input operands and using a plurality of functional units as a predetermined group. The arrangement comprises a first vector input operand A(t) 310, a second vector input operand B(t) 320, a matrix 330, a previous state store 340, an ASIMD multiplier unit 350 and a result vector 360. Elements of the first vector input operand A(t) 310 are used to populate the matrix 330 according to a matrix population pattern that is dependent upon the single program instruction being executed. The state store 340 is operable to store previous values of the vector input operand A. In this particular example, the matrix 330 is a one dimensional (1D) aperiodic convolution matrix so some entries ($a_1$, $a_2$, $a_3$) of the matrix 330 derive from the state store 340 containing the previous input operand A(t−1), whilst other elements of the matrix ($a_0$, $a_1$, $a_2$ and $a_3$) correspond to constituent elements of the current vector input operand A(t). Vector input elements from a previous computational cycle may or may not be taken from the state store 340 for use in population of the matrix 330. Utilisation of values from the state store 340 depends upon the particular program instruction word that is being executed. The n×n matrix is supplied to the ASIMD multiply unit 350 where it multiplies the n-element vector input operand B(t) to produce the n-element result vector Y 360.

FIGS. 4A, 4B, 4C and 4D schematically illustrate alternative ways in which the population pattern of the matrix of the matrix-vector product of FIG. 3 can be specified. FIG. 4A schematically illustrates a machine-level instruction having an opcode field 410 and a matrix type specifier field 420. The opcode field 410 specifies the computational operation to be performed and the matrix type specifier field specifies one of a plurality of possible matrix types to be used in the matrix vector operation that is performed during execution of the program instruction according to the present technique (as shown in FIG. 3). In FIG. 4B the matrix type is specified implicitly in the way that the function "functionA" is defined. In FIG. 4C the matrix type is specified explicitly by the first of the three function arguments i.e. "matrixN". In FIG. 4D the matrix type is specified as a command input to the data processing logic 140 (see FIG. 1) which sets a particular computational mode that determines the matrix type that will be used in the matrix-vector multiply of FIG. 3.

Figure 5:
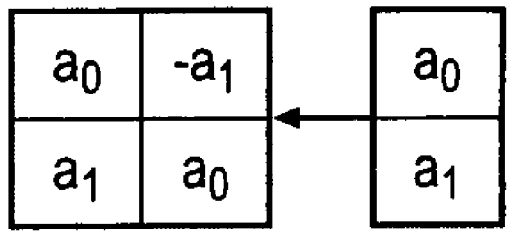
FIG. 5 schematically illustrates construction of a 1D negacyclic convolution matrix.

FIG. 5 schematically illustrates construction of a 1D negacyclic convolution matrix, from a vector input operand. A 1D negacyclic two-point convolution can be expressed by the following equation:

$$\vec{y} = conv2n(\vec{a}, \vec{b}) \rightarrow \begin{bmatrix} y_0 \\ y_1 \end{bmatrix} = \begin{bmatrix} a_0 & -a_1 \\ a_1 & a_0 \end{bmatrix} \cdot \begin{bmatrix} b_0 \\ b_1 \end{bmatrix} \qquad \text{eqn. 3}$$

Alternatively, the same 1D negacyclic convolution can be expressed by the following polynomial product:

$$y(z) = a(z) \cdot b(z) \bmod(z^2+1) \qquad \text{eqn. 4}$$

The 1D negacyclic convolution matrix of FIG. 5 can be used to perform a complex multiply operation on a pair of two-element vector input operands $a = a_0 + ja_1$ and $b = b_0 + jb_1$. Note that j is a root of the term ($z^2+1$) in the polynomial product of eqn. 4. The complex multiply can be expressed as:

$$\vec{a} * \vec{b} = \begin{pmatrix} a0 & -a1 \\ a1 & a0 \end{pmatrix} \cdot \begin{pmatrix} b0 \\ b1 \end{pmatrix} = \begin{pmatrix} a0b0 - a1b1 \\ a1b0 + a0b1 \end{pmatrix} = \vec{y} \qquad \text{eqn. 5}$$

It can be seen that in this case, the matrix is populated using the two elements of the input vector operand $\vec{a}$. The first element of the result vector y is the real component of the complex multiply result whereas the second element is the imaginary component.

Figure 6:
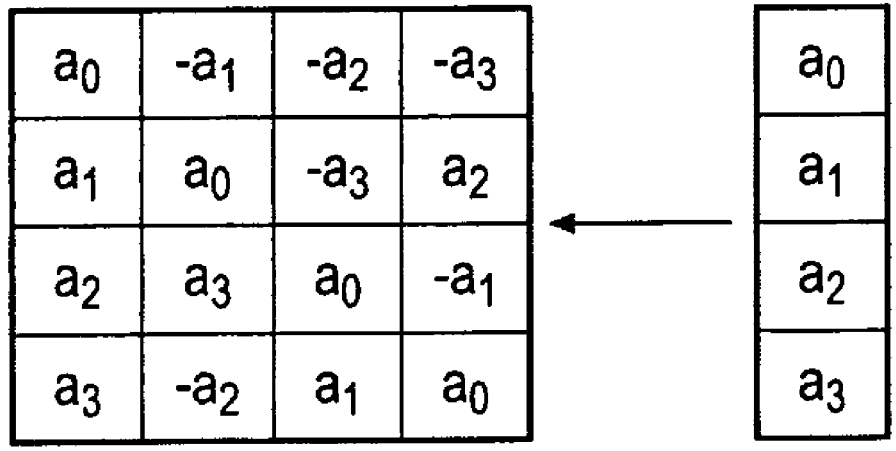
FIG. 6 schematically illustrates construction of a modified 2D negacyclic convolution matrix from a single vector having two partitions, each partition having two elements.

FIG. 6 schematically illustrates construction of a modified 2D negacyclic matrix. A 2×2 negacyclic convolution can be expressed by the following bivariate polynomial equation:

$$y(z_1,z_2) = a(z_1,z_2) \cdot b(z_1,z_2) \bmod((z_1^2+1) \cdot (z_2^2+1)) \qquad \text{eqn. 6}$$

The polynomial product $a(z_1,z_2) \cdot b(z_1,z_2)$ of eqn. 6 corresponds to a 2D filtering operation. According to this filtering operation a 2×2 input area results in a 3×3 output area. The modulo operation in the polynomial equation wraps the borders back according to the rule "$z^2 = -1$" in two dimensions.

In a 1D matrix representation, using Kronecker product rules using a 2D delay matrix:

$$\begin{bmatrix} 1, 1 & 1, z_2^{-1} \\ z_1^{-1}, 1 & z_1^{-1}, z_2^{-1} \end{bmatrix}$$

This bivariate polynomial equation (eqn. 6) can thus be represented as:

$$Y = conv2x2n(A, B) \rightarrow \begin{bmatrix} y_{00} \\ y_{01} \\ y_{10} \\ y_{11} \end{bmatrix} = \begin{bmatrix} a_{00} & -a_{01} & -a_{10} & a_{11} \\ a_{01} & a_{00} & -a_{11} & -a_{10} \\ a_{10} & -a_{11} & a_{00} & a_{01} \\ a_{11} & a_{10} & a_{01} & a_{00} \end{bmatrix} \cdot \begin{bmatrix} b_{00} \\ b_{01} \\ b_{10} \\ b_{11} \end{bmatrix} \quad \text{eqn. 7}$$

According to the present technique, the matrix of the matrix-vector calculation performed during execution of the program instruction can be constructed in dependence upon at least one vector element of at least one vector input operand, but the signs of the positions {0,3}, {1,3}, {2,1}, {3,1} can be reversed in the above 1D matrix representation can be reversed to arrive at the matrix illustrated in FIG. 6. As shown in FIG. 6, the 4 by 4 two-dimensional negacyclic convolution matrix is formed from a single vector (a0, a1, a2, a3) where a0=$a_{00}$, a1=$a_{01}$, a2=$a_{10}$ and a3=$a_{11}$. This single vector can be considered to be formed from two partitions, where the first partition corresponds to the elements a0 and a1 and the second partition corresponds to the elements a2 and a3.

The 2D-modified negacyclic convolution matrix of FIG. 6 can be used to perform quaternion multiplication. The 4×4 matrix is populated using elements of the four element vector input operand $\vec{a}$=(a0 a1 a2 a3). Quaternions are an example of the general class of hypercomplex numbers. Quaternions form a mathematical division ring and are associative but non-commutative. A quaternion H=(a1, a1, a2, a3) can be written as the following linear combination:

$$H = \alpha_0 \cdot 1 + \alpha_1 i + \alpha_2 j + \alpha_3 k \text{ where } i^2 = j^2 = k^2 = ijk = -1$$

and the product of two quaternions is given by:

$$\begin{aligned} a * b &= (a_0 b_0 - a_1 b_1 - a_2 b_2 - a_3 b_3) + \\ & \quad i(a_0 b_1 - a_1 b_0 - a_2 b_3 - a_3 b_2) + \\ & \quad j(a_0 b_2 - a_1 b_3 - a_2 b_0 - a_3 b_1) + \\ & \quad k(a_0 b_3 - a_1 b_2 - a_2 b_1 - a_3 b_0) \\ &= \begin{pmatrix} a_0 & -a_1 & -a_2 & -a_3 \\ a_1 & a_0 & -a_3 & a_2 \\ a_2 & a_3 & a_0 & -a_1 \\ a_3 & -a_2 & a_1 & a_0 \end{pmatrix} \cdot \begin{pmatrix} b_0 \\ b_1 \\ b_2 \\ b_3 \end{pmatrix} \end{aligned} \quad \text{eqn. 8}$$

Thus, according to the present technique the vector input operands are four-element vectors corresponding to the quaternions a and b and during execution of the single program instruction, the matrix vector product shown above is calculated. It can be seen that the 4×4 matrix of eqn. 8 is identical to the 2D modified negacyclic convolution matrix of FIG. 6.

FIG. 7 schematically illustrates the construction of a 1D aperiodic convolution matrix according to the present technique. A convolution expresses the overlap of one function over another function. The continuous convolution of the two functions f and g over the time interval [0, t] is given by:

$$f * g \equiv \int_0^t f(\tau) g(t-\tau) d\tau \quad \text{eqn. 9}$$

In digital filtering many filtering operations are linear-shift invariant (LSI) operations, which can be described by the following discrete time equation:

$$y[n] = \sum_{i=-\infty}^{\infty} x[i] h[n-i] = \sum_{i=-\infty}^{\infty} h[i] x[n-i] \quad \text{eqn. 10}$$

where h[n] typically is the impulse response of a filter, x[n] is the filter input and y[n] is the filter output.

When the impulse response h[n] of the filter is a Finite Impulse Response (FIR) and, as such, has finite length such that it is defined on the interval $0 \leq n < N-1$. The input sequence x[n] is also finite in length and it follows that the above LSI convolution sum equation reduces to the following finite summation:

$$y[n] = \sum_{i=0}^{M-1} x[i] h[n-i] = \sum_{i=0}^{N-1} h[i] x[n-i] \quad \text{eqn. 11}$$

$$0 \leq n < M + N - 1$$

The above LSI convolution sum equation is a 1D discrete linear (i.e. aperiodic) convolution. 1D linear convolution can be expressed as a matrix-vector product:

$$\vec{y} = T\vec{x} \quad \text{eqn. 12}$$

where T is a matrix of dimension M×N and x and y are each n-element vectors representing the input sequence and the output sequence respectively. The matrix T is a matrix whose elements represent samples of the finite impulse response sequence h[n]. Linearity of equation (11) allows for the computation of y[n] by summing partial convolutions computed from sections of h[n] and x[n], much smaller than M and N.

Computation of a 1D aperiodic convolution from the above-mentioned partial products can be expressed in two different ways: (i) overlap-add formulation; or (ii) overlap-save formulation. Considering the overlap-add formulation, a partial four point 1D aperiodic convolution can be expressed as follows:

$$\vec{y} = conv4a(\vec{a}, \vec{b}) \rightarrow \begin{bmatrix} y_0 \\ y_1 \\ y_2 \\ y_3 \end{bmatrix} = \begin{bmatrix} a_0 & 0 & 0 & 0 \\ a_1 & a_0 & 0 & 0 \\ a_2 & a_1 & a_0 & 0 \\ a_3 & a_2 & a_1 & a_0 \\ 0 & a_3 & a_2 & a_1 \\ 0 & 0 & a_3 & a_2 \\ 0 & 0 & 0 & a_3 \end{bmatrix} \cdot \begin{bmatrix} b_0 \\ b_1 \\ b_2 \\ b_3 \end{bmatrix} \quad \text{eqn. 13}$$

FIG. 7 schematically illustrates construction of a 1D aperiodic convolution matrix (which is a Toeplitz matrix) used to perform a matrix-vector calculation according to the present technique using the equivalent matrix T' in the overlap-save formulation of eqn. 13.

Alternatively, the 1D aperiodic convolution can be expressed as the polynomial product:

$$y(z) = a(z) \cdot b(z) \quad \text{eqn. 14}$$

The vector "$y_t$" can be considered to contain the partial results of a longer convolution. The final result can be obtained by adding the partial results of the previous output "$y_{t-1}$". This operation involving use of a previously stored state can be introduced into a matrix equation, leading to the following overlap-save 1D aperiodic convolution representation:

$$\vec{y} = conv4a'(\vec{a}, \vec{b}) \rightarrow \begin{bmatrix} y_0 \\ y_1 \\ y_2 \\ y_3 \end{bmatrix} = \begin{bmatrix} a_0 & a_{-1} & a_{-2} & a_{-3} \\ a_1 & a_0 & a_{-1} & a_{-2} \\ a_2 & a_1 & a_0 & a_{-1} \\ a_3 & a_2 & a_1 & a_0 \end{bmatrix} \cdot \begin{bmatrix} b_0 \\ b_1 \\ b_2 \\ b_3 \end{bmatrix} \quad \text{eqn. 15}$$

In the overlap-save representation of eqn 15, the matrix T is a Toeplitz matrix equivalent to the representation of eqn. 13 and the matrix shown in FIG. 7. A four-element vector input operand (a0, a1, a2, a3) 710 is received by a decoder of the data processing apparatus. The data processing apparatus stores the current version a(t) of the vector input operand to the state store 340 (see FIG. 3). The decoder reads a previously stored version 720 of the vector input operand "a" from the state store 340 corresponding to the vector input operand value at time (t−1). The delay element 730 in FIG. 7 indicates that a(t−1) is a value of a corresponding to a previous iteration of the computation. Vector elements of both a(t) and a(t−1) are used to construct the Toeplitz matrix 740 that is used in the matrix-vector operation performed during execution of the single program instruction that operates on the vector input operand a(t). Note that the diagonal elements of the Toeplitz matrix 740 are all a0, the upper triangular portion is formed from elements of a(t) and the lower triangular portion is formed from elements of a(t−1). Note that in eqn. 15, the Toeplitz is transposed relative to the matrix 740, which is only a matter of notation. The 1D aperiodic convolution matrix of FIG. 7 is constructed from a single input vector and a single (partially) stored vector.

A different type of convolution from the aperiodic/linear convolution is a circular convolution. The following equation describes a 1D circular convolution of finite length sequences h[n] and x[n], both sequences being of length N.

$$y[n] = \sum_{i=0}^{N-1} x[i]h[|n-i|_N] = \sum_{i=0}^{N-1} h[i]x[|n-i|_N] \quad \text{eqn. 16}$$

$$0 \le n \le N-1$$

where $|n-i|_N$ represents (n−i) modulo N. Circular convolution is required for computations that involve a discrete Fourier Transform implementation of convolution. The 1D circular convolution can be expressed as a matrix-vector product as follows:

$$\vec{y} = C\vec{x} \quad \text{eqn. 17}$$

where C is a circulant matrix of dimension n×n and y and x are each n-element vectors. The matrix entries of C are formed from the samples of the finite impulse response sequence h[n]. A circulant matrix has the property that each row (column) is a circular shift of a previous row (column).

2D linear convolution is a straightforward extension of 1D linear convolution, and is used for digital image processing operations such as edge detection in images. The following formula defines a 2D linear convolution:

$$y[n_1, n_2] = \sum_{i=0}^{M_1-1} \sum_{j=0}^{M_2-1} a[i,j]x[n_1-i, n_2-j] \quad \text{eqn. 18}$$

$$= \sum_{i=0}^{L_1-1} \sum_{j=0}^{L_2-1} x[i,j]a[n_1-i, n_2-j]$$

where the x[n1, n2] represents a discrete two-dimensional input sample of dimensions L1, L2, h[n1, n2] is the impulse response function having dimensions M1 and M2 and y[n1, n2] is the output function having dimensions. In the case where the linear transformation defined by the impulse response function a[n1,n2] is separable, the 2D linear convolution can be expressed in matrix notation as follows:

$$Y = (T_{row} \otimes T_{col}) \cdot X = T_{row} \cdot X \cdot T_{col}^T \quad \text{eqn. 19}$$

where $T_{row}$ is a row operator, $T_{col}$ is a column operator and $T_{col}^T$ represents the transpose of the column operator $T_{col}$. For a 2D circulant (rather than a 2D aperiodic) convolution, the Toeplitz matrix T in the above equations is replaced by a circulant matrix C.

Figure 8:
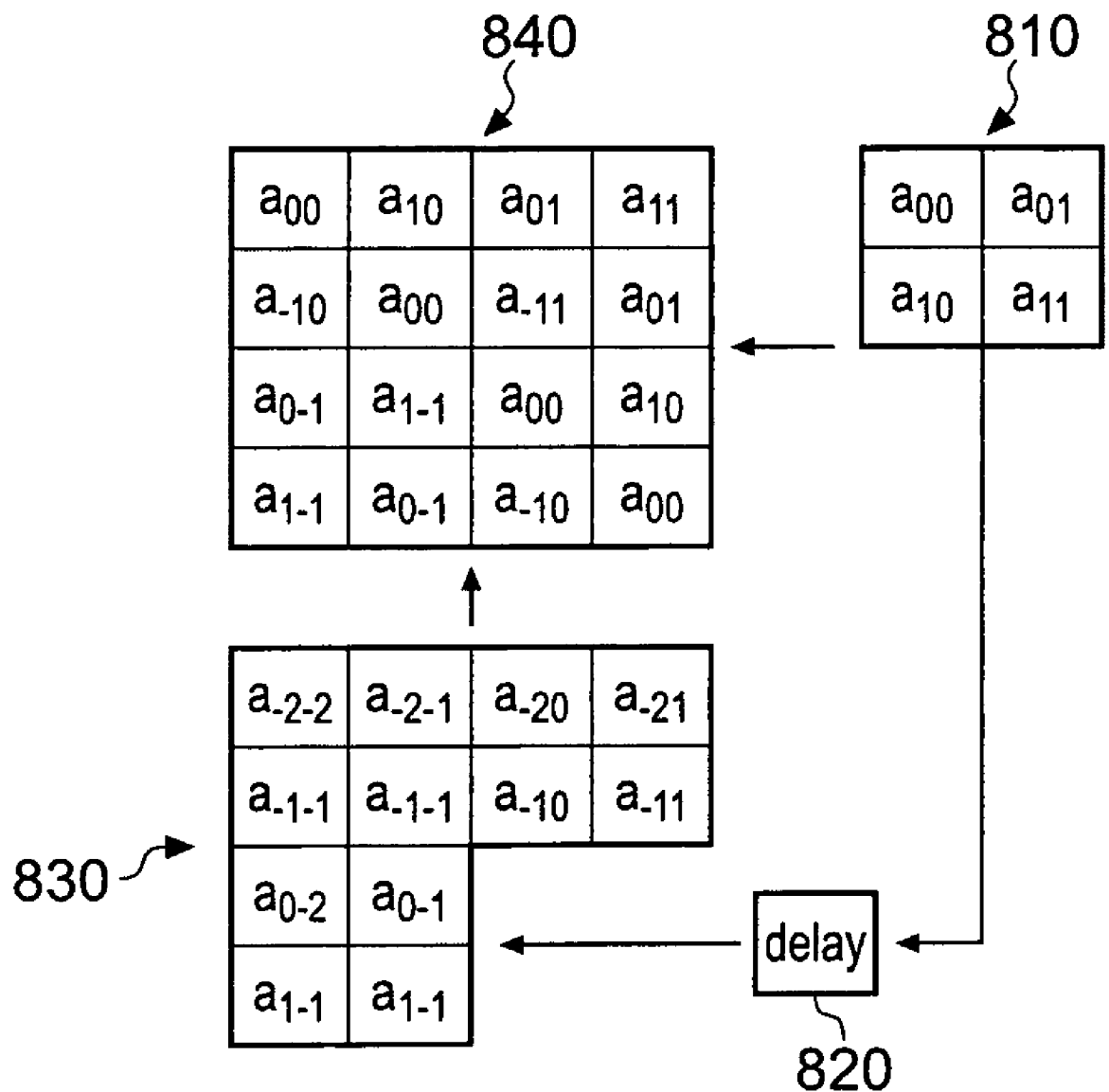
FIG. 8 schematically illustrates construction of a 2D aperiodic convolution matrix from a single input vector and three (partially) stored vectors, each containing two partitions of two elements.

FIG. 8 schematically illustrates a 2D aperiodic convolution matrix (also a Toeplitz matrix) in its 1D equivalent representation of eqn 19 used to perform a matrix-vector calculation according to the present technique constructed with Kronecker product rules using the 2D delay matrix.

$$\begin{bmatrix} 1,1 & 1, z_2^{-1} \\ z_1^{-1}, 1 & z_1^{-1}, z_2^{-1} \end{bmatrix}$$

In FIG. 8 a vector input operand 810 is given by a two partion vector a=($a_{00}$, $a_{01}$, $a_{10}$, $a_{11}$). Data block 830 contains time-delayed values of the vector input operand that have been previously stored in the state store 340 (see FIG. 3). The delay is represented by the delay element 820. A 2D aperiodic convolution matrix 840 is constructed from the current value of the vector input operand a(x,y) as well as a subset of delayed values of each partition of a: a($x^{-1}$, $y^0$), a($x^0$, $y^{-1}$) and a($x^{-1}$, $y^{-1}$) derived from the state store 340. In the delayed values, the index associated with the delayed element steps down by two since the vector input operands are two element vectors. Note that only a subset of the stored delayed values is used to populate the 2D aperiodic convolution matrix 840. In particular, the values $a_{-1-1}$, $a_{-10}$, $a_{-11}$, $a_{-1-1}$ and $a_{0-1}$ are used to the populate matrix 840.

A 2D aperiodic convolution (overlap-save formulation) can be derived from the following polynomial product:

$$y(z_1, z_2) = a(z_1, z_2) \cdot b(z_1, z_2) \quad \text{eqn. 20}$$

Alternatively the 2D aperiodic convolution can be considered to be a 2×2 filter (matrix B) moving over the 3×3 area defined by matrix A in the following matrix formulation:

$$Y = \left( \begin{bmatrix} z_1^{-1}, z_2^{-1} & z_1^{-1}, 1 \\ 1, z_2^{-1} & 1, 1 \end{bmatrix} \otimes \begin{bmatrix} a_{00} & a_{01} \\ a_{10} & a_{11} \end{bmatrix} \right) \cdot \begin{bmatrix} b_{00} & b_{01} \\ b_{10} & b_{11} \end{bmatrix} \quad \text{eqn. 21}$$

-continued $$= \left[ \begin{array}{cc} \left[ \begin{array}{cc} a_{-1-1} & a_{-10} \\ a_{0-1} & a_{00} \end{array} \right] & \left[ \begin{array}{cc} a_{-10} & a_{-11} \\ a_{00} & a_{01} \end{array} \right] \\ \left[ \begin{array}{cc} a_{0-1} & a_{00} \\ a_{1-1} & a_{10} \end{array} \right] & \left[ \begin{array}{cc} a_{00} & a_{01} \\ a_{10} & a_{11} \end{array} \right] \end{array} \right] \cdot \left[ \begin{array}{cc} b_{00} & b_{01} \\ b_{10} & b_{11} \end{array} \right]$$

Or in convolution form $$Y = \left[ \begin{array}{ccc} a_{-1-1} & a_{-10} & a_{-11} \\ a_{0-1} & a_{00} & a_{01} \\ a_{1-1} & a_{10} & a_{11} \end{array} \right] \otimes \left[ \begin{array}{cc} b_{00} & b_{01} \\ b_{10} & b_{11} \end{array} \right]$$

The construction of the ASIMD matrix of FIG. 8 reflects four in-products, that define result of eqn 21, these in-products are given by:

$$Y_{n,m} = \sum_{i=0}^{1} \sum_{j=0}^{1} b_{i,j} \cdot a_{(i-n),(j-m)}$$

$$Y_{00} = b_{00}a_{00} + b_{01}a_{01} + b_{10}a_{10} + b_{11}a_{11};$$

$$Y_{01} = b_{00}a_{0-1} + b_{01}a_{00} + b_{10}a_{1-1} + b_{11}a_{10};$$

$$Y_{10} = b_{00}a_{-10} + b_{01}a_{-11} + b_{10}a_{00} + b_{11}a_{01}$$

$$Y_{11} = b_{00}a_{-1-1} + b_{01}a_{-10} + b_{10}a_{0-1} + b_{11}a_{00}$$

Corresponding to the four 2D inner products in equation 21. Here, the inner product is defined to be the sum of the element-by-element multiplied data structure, which in this particular example is a 2×2 matrix.

This relates to a matrix vector product calculated using the 4×4 matrix of FIG. 8 as follows:

$$\left( \begin{array}{c} Y_{00} \\ Y_{10} \\ Y_{01} \\ Y_{11} \end{array} \right) = \left[ \begin{array}{cccc} a_{00} & a_{10} & a_{01} & a_{11} \\ a_{-10} & a_{00} & a_{-11} & a_{01} \\ a_{0-1} & a_{1-1} & a_{00} & a_{10} \\ a_{-1-1} & a_{0-1} & a_{-10} & a_{00} \end{array} \right] \left( \begin{array}{c} b_{00} \\ b_{10} \\ b_{01} \\ b_{11} \end{array} \right)$$

A similar mathematical processing operation to discrete linear convolution is discrete linear correlation. Rather than determining an overlap between two functions, the linear correlation is used to search for the occurrence of a predetermined pattern in the input data. A positive match is indicated by a large response. Linear correlation is defined by the following equation:

$$y[n] = \sum_{i=0}^{M-1} x[i]h'[n+i] = \sum_{i=0}^{N-1} h'[i]x[n+i] \quad \text{eqn. 22}$$

$$0 \le n < M + N - 1$$

Where h'[n] is the "template" for the matching operation. A 2D discrete correlation can be defined by straightforward extension of the above 1D linear correlation function.

Figure 9:
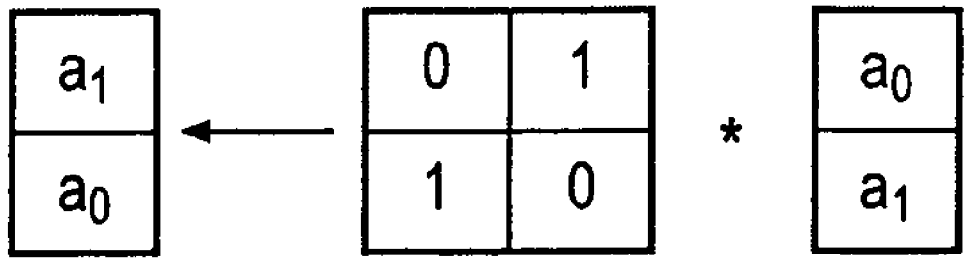
FIGS. 9A, B and C schematically illustrate three different categories of permutation matrix that can be used to perform execution of an ASIMD program instruction.
Figure 9:
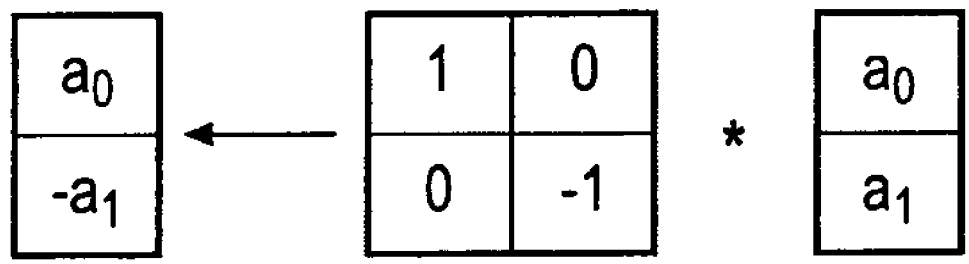
Figure 9:
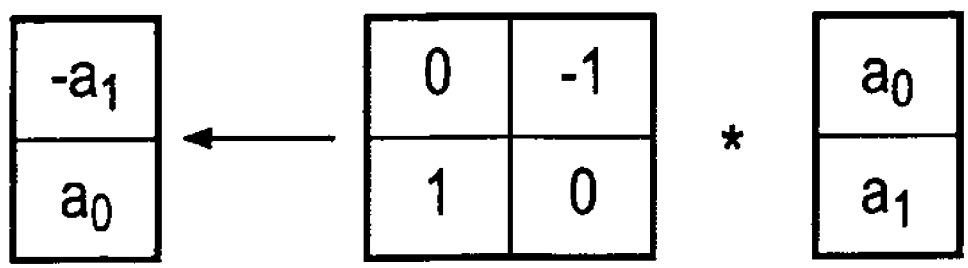

FIGS. 9A, 9B and 9C schematically illustrate three different categories of permutation matrix that can be specified in one of the plurality of ways illustrated in FIGS. 4A to 4D to perform execution of ASIMD program instructions according to the present technique. In the three examples of FIGS. 9A, B, C a two element input vector a=(a0,a1)=a0+ja1 that represents a complex number is operated on by the specified matrix to produce a transformed output vector.

In FIG. 9A, a 1D reflection matrix having zeros on the main diagonal and ones as off-diagonal elements is used to multiply the vector input operand (a0, a1) to produce a vector output operand (a1, a0) in which the real and imaginary components of the input vector have been interchanged.

In FIG. 9B, a 1D conjugation matrix having two off-diagonal zeros, a minus one in the upper right-hand corner and a one in the lower left-hand corner is used to multiply the vector input operand (a0, a1) to produce the vector output operand (a0, −a1)=a0−ja1, which represents the complex conjugate of the vector input operand.

In FIG. 9C a 1D rotation matrix having zeros on the main diagonal, a minus one in the upper right-hand corner and a one in the lower left-hand corner is used to multiply the vector input operand (a0, a1) to produce a vector output operand (−a1, a0) representing a complex rotation of the vector input operand.

Although the mathematical manipulations involving the matrix-vector products of FIG. 9A to 9C are known per se, it is the manner in which the mathematical operation is performed in the data processing apparatus according to the present technique that offers an advantage over known SIMD parallel processing techniques. In particular, the decoder is responsive to an ASIMD program instruction (a different program instruction for each of the three operations of FIGS. 9A, B and C) to concurrently execute that program instruction on each of the two elements of the input vector operand (a0, a1). The particular type of matrix associated with the respective program instruction is specified implicitly or explicitly by the program instruction or by a command input to the arithmetic logic unit. The particular matrix type in turn constrains the functional units 142, 144, 146 of the data processing apparatus 100 to act in predetermined groups on each of the vector input elements to calculate the desired output vector.

FIGS. 5 to 9 as described above represent examples of matrix categories that can be used by the decoder of the data processing apparatus according to the present technique. A single program instruction is concurrently executed under control of the decoder 130 on each element of a plurality of vector input operands. In general the matrices are non-identity matrices and the categories of matrix described include permutation matrices, sign matrices, Toeplitz matrices and circulant matrices. Other types of non-identity matrix could also be implemented by the data processing apparatus according to the present technique.

The Toeplitz matrix category comprises: (a) linear (i.e. aperiodic) matrices, which are utilised in performing quaternion arithmetic as well as digital filtering and correlations; and (b) negacyclic convolution matrices, which are utilised to perform complex arithmetic. By way of contrast, the circulant matrix category comprises (a) circular convolution matrices, which are used to perform Discrete Fourier Transforms (DFTs) and Fast Fourier Transforms and (b) cyclic (i.e. periodic) convolution matrices.

Furthermore, according to the present technique, the vector input operands can have a plurality of different formats. In particular, in the above described examples, the vector input operand could comprise: a partition of a time sequence (leading to the aperiodic convolution; or a representation of a given algebra (e.g. complex numbers leading to the negacyclic convolution). A further alternative format of the vector input operands is where the individual vector elements of the vector input operand are partitions of a multi-precision representation, for example, such that a single data word having n elements, or digits, has n times the number of bits of the individual vector elements. Each of the elements of the vectors has a weight $2^{(k*m)}$, where k is the number of bits per element, and m the element index. Thus, for example, the data word 101110 (binary) can be represented as the vector (x, y, z)=(10, 11, 10). In this example k=2 and the digit index is 0 for vector element x, 1 for vector element y and 2 for vector element z. Accordingly, vector element x has a weight of 1, vector element y has a weight of 4 (corresponding to a bit-shift of two positions) and vector element x has a weight of 16 (corresponding to a bit-shift of four positions).

Figure 10:
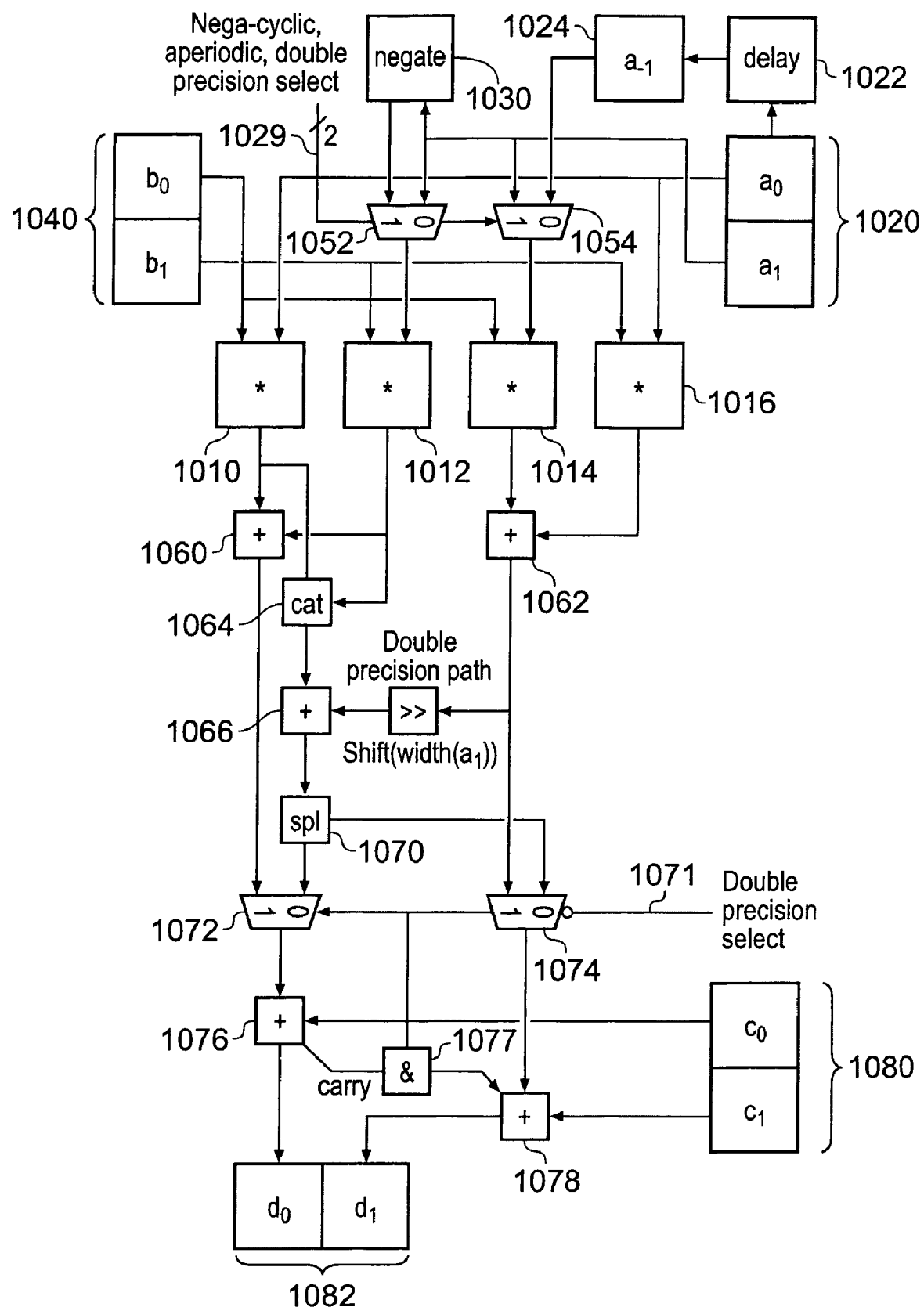
FIG. 10 schematically illustrates a multi-modal ASIMD multiply-accumulate unit.

FIG. 10 schematically illustrates a multi-modal ASIMD multiply-accumulate unit. The arrangement of FIG. 10 is operable to perform the following computations according to the present technique:

(i) negacyclic convolution operations associated with complex algebra or quaternion algebra;

(ii) aperiodic (i.e. linear) convolution operations associated with digital filtering and correlations; and (iii) multi-precision arithmetic.

Furthermore, the arrangement of FIG. 10 is operable to perform double precision scalar algebra operations. In this case two input registers are operable to store the high-word and low-word sections of the scalar input operands respectively.

The arrangement of FIG. 10 comprises: four multipliers 1010, 1012, 1014, 1016; a first input register 1020 and associated delay element 1022; a first select line 1029; a negation unit 1030; a second input register 1040; a first multiplexer 1052; a second multiplexer 1054; a first adder 1060; a second adder 1062; a concatenator 1064; a third adder 1066; a shifter 1068; a splitter 1070; a second select line 1071; a third multiplexer 1072; a fourth multiplexer 1074; a fourth adder 1076; a carry unit 1077; a fifth adder 1078; a third input register 1080 and an output register 1082. Select signals supplied via the first select line 1029 select between a negacyclic mode, an aperiodic mode and a double precision mode and control of the first multiplexer 1052 and the second multiplexer 1054 in dependence upon the given mode of operation. A double precision select signal supplied via the second select line 1071 controls the output of the third multiplexer 1072 and the fourth multiplexer 1074 such that the output of the splitter 1070 is selected for output by each of the third multiplexer 1072 and the fourth multiplexer 1074 in the double precision mode.

The first multiplier 1010 receives a first input b0 from the second input register 1040 and a second input a0 from the first input register 1020. The first multiplier 1010 multiplies these two inputs and supplies the result as an input to the first adder 1060. The second multiplier 1012 receives a first input b1 from the second input register 1040 and its second multiplicand is supplied via the first multiplexer 1052 in dependence upon the value of a select signal supplied via the first select line 1029, which selects between a value of (−a1) supplied to the multiplexer terminal via the negation unit 1030 and a value of a1 that is supplied to the other terminal of the first multiplexer 1052 from the first input register 1020. If the negacyclic mode is selected (via the control input to the first and second multiplexers 1052, 1054) then the first multiplexer 1052 selects the value (−a1). However, if either the aperiodic mode or the double precision mode is selected then the first multiplexer 1052 outputs the value a1. The output of the second multiplier 1012 is supplied to both the first adder 1060 and to the concatenor 1064 as an input. Note that the output value of the circuit branch comprising the concatenator 1064, the third adder 1066 and the splitter 1070 is only selected for output by the third and fourth multiplexers 1072 and 1074 when the circuit is configured to operate in the double precision mode.

The third multiplier 1014 receives a first input b0 from the second input register 1040 and a second input from the second multiplexer 1054, which, like the first multiplexer 1052, has an output dependent upon the control signal of the first and second multiplexers 1052, 1054. The second multiplexer is operable to output the value a1 from the first input register 1020 if operating either in negacyclic mode or in double precision mode but to output the time delayed value $a_{-1}$ from the delay element 1024 when operating in aperiodic mode. The output from the third multiplier 1014 is supplied as input to the second adder 1062. The fourth multiplier 1016 receives a first input b1 from the second input register 1040 and a second input a0 from the first input register 1020 and thus calculates the product a0*b1, which is output to the second adder 1062. Thus the output of the first adder 1060 in aperiodic mode is (a0*b0+a1*b1), in double precision mode the adder is bypassed. Whereas the output of the first adder 1060 in negacyclic mode is (a0*b0−a1*b1). The output of the second adder 1062 in both negacyclic mode and double precision mode is (a0*b1+a1*b0) whereas the output of the second adder 1062 in aperiodic mode is (a0*b1+$a_{-1}$*b0).

As mentioned above, the circuit branch incorporating the concatenator 1064, the shifter 1068, the adder 1066 and the splitter 1070 calculates a value that is only output in double precision mode. In particular, in double precision mode, the concatenator 1064 is operable to concatenate the values a1*b1 and a0*b1, the shifter 1068 shifts the value a0*b1+a1*b0 (output by the second adder 1062) by the number of bits in a single vector element (say m bits) and thus the third adder 1066 outputs a value corresponding to cat [a1*b1, a0*b0]+>>$_{m\ bits}$[a0*b1+a1*b0]. Which is the double precision multiply output. This value is then split into high and low bit portions by the splitter 1070 and subsequently supplied to both the third multiplexer 1072 and the fourth multiplexer 1074 for output in double precision mode.

The vector elements d0 and d1 of the output register 1082 store values dependent upon the outputs of the third multiplexer 1072 and the fourth multiplexer 1074 respectively. The vector input elements c0 and c1 from the third input register 1080 are optionally added to the respective values output by the third multiplexer 1072 and the fourth multiplexer 1074 to form the result vector elements d0 and d1. The fourth adder 1076 adds c0 to the output of the third multiplexer 1072 and stores the result in field d0 of the output register 1082. The fifth adder 1078 adds c1 to the output of the fourth multiplexer 1074 and stores the result in filed d1 of the output register 1082. The carry unit 1077 is situated between the fourth adder 1076 and the fifth adder 1078 and ensures that when in double precision mode any carry value is passed between these two adders. The input register 1080 can be used to perform an accumulation operation in any one of the negacyclic mode, the aperiodic mode or the double precision mode.

Note that the 1D negacyclic matrix computation as illustrated in FIG. 5 can be represented as follows:

$$\begin{pmatrix} d0 \\ d1 \end{pmatrix} = \begin{pmatrix} a_0 & -a_1 \\ a_1 & a_0 \end{pmatrix} \cdot \begin{pmatrix} b_0 \\ b_1 \end{pmatrix} = \begin{pmatrix} a_0 b_0 - a_1 b_1 \\ a_1 b_0 + a_0 b_1 \end{pmatrix} \qquad \text{eqn. 23}$$

Eqn 23 represents the contents of the output register 1082 of FIG. 10 when the circuit is operating in the negacyclic mode and when the optional addition of the input vector (c0, c1) is not performed.

Note that the 1D aperiodic matrix computation illustrated in FIG. 7 can be represented as follows:

$$\begin{pmatrix} d0 \\ d1 \end{pmatrix} = \begin{pmatrix} a_0 & a_1 \\ a_{-1} & a_0 \end{pmatrix} \cdot \begin{pmatrix} b_0 \\ b_1 \end{pmatrix} = \begin{pmatrix} a_0 b_0 + a_1 b_1 \\ a_{-1} b_0 + a_0 b_1 \end{pmatrix} \quad \text{eqn. 24}$$

Eqn 24 represents the contents of the output register 1082 of FIG. 10 when the circuit is operating in the aperiodic mode and when the optional addition of the input vector (c0, c1) is not performed.

In double precision mode, the four partial products a0*b0, a1*b0, a0*b1 and a1*b1 are formed, and the equally weighted results are added this corresponds to the matrix vector operation:

$$\begin{bmatrix} d_0 \\ d_1 \\ d_2 \end{bmatrix} = \begin{bmatrix} a_0 & 0 \\ a_1 & a_0 \\ 0 & a_1 \end{bmatrix} \cdot \begin{bmatrix} b_0 \\ b_1 \end{bmatrix}$$

Where each $d_i$ is a partial product of 2n bits with weight $2^{(n*i)}$.

In the arrangement of FIG. 10 execution of a single program instruction results in operations being performed by the predetermined group of multipliers 1010, 1012, 1014, 1016 on each and every element of each of a plurality of vector input operands a=(a0, a1), b=(b0, b1) and c=(c0, c1) to produce the output vector (d0, d1). The program instruction is defined so as to receive vectors rather than scalars as input operands and constrains the functional units of the data processing apparatus (in this case the multipliers 1010, 1012, 1014 and 1016) to operate in a predetermined group in dependence upon the particular single program instruction.

In alternative arrangements to the arrangement of FIG. 10, the ASIMD multiply-accumulate unit could perform the 1D negacyclic and aperiodic convolutions using a group of three single precision multipliers, rather than the group of four multipliers 1010, 1012, 1014, 1016 as shown in FIG. 10. Furthermore, to perform the 2D convolution operations as illustrated with reference to FIG. 6 (for 2D negacyclic) and FIG. 8 (for 2D aperiodic), a predetermined grouping of six multipliers or nine multipliers could be used. Similar arrangements to the arrangement of FIG. 10 can be used to further generalise from 1D and 2D negacyclic and aperiodic convolutions to multi-dimensional convolutions. Accordingly, the present technique can be applied to implementation of multi-dimensional computations such as Lagrange interpolation, the CookToom algorithm or the Karatsuba multiplier.

In the case of multi-dimensional computations the vector input operand could be extended to be an Nth rank tensor in M-dimensional space (vector of length M), where N is greater than or equal to one to exclude scalar inputs. The matrix of the matrix-vector operation associated with execution of the single program instruction then generalises to an (N+1)th rank tensor in M-dimensional space constructed in dependence upon $2^N$ current and time-delayed Nth rank tensor inputs. Although the illustrative examples described above relate to matrices associated with one and twodimensional problems only, the technique also applies to multi-dimensional computations by applying an equivalent Kronecker product rule to that expressed by eqn 19. In the case of multidimensional computations the vector input operand is a concatenation of M equal-length sections of length N, where M is the dimensionality of the original data-set and N is the number of digits per dimension. The non-identity matrix is of size NM rows by NM columns and is formed as the N-fold Kronecker product of the non-identity matrices of size M by M formed according to any of the previous embodiments. This is possible due to the separability of the dimensions.

The present technique can be used to perform a variety of different mathematical operations, which are commonly employed in signal processing applications. According to the present technique, a single program instruction is executed as a matrix-vector calculation. As has been explained above, a complex multiply operation can be performed using a 1D negacyclic convolution matrix in the matrix-vector calculation (see FIG. 5). Quaternion multiplication or 2D filtering can be performed using a 2D negacyclic convolution matrix (see FIG. 6). A convolution operation can be performed using a 1D aperiodic convolution matrix (which is a type of Toeplitz matrix) (see FIG. 7). A 2×2 filter operating on a 3×3 area can be performed using a 2D aperiodic convolution matrix (see FIG. 8). According to the present technique a plurality of functional units are arranged to operate as a predetermined group on vector input operands such that a single program instruction is executed by the decoder of the data processing apparatus as at least a matrix-vector calculation, using an appropriate non-identity matrix in dependence upon the processing operation to be performed.

Mathematical operations (corresponding to, for example, digital signal processing operations) can generally be represented in terms of mathematical manipulation of polynomials. Such polynomial representations can be readily translated to a matrix formulation for implementation of the corresponding mathematical manipulation according to the present technique. A simple example was explained above in relation to a complex multiply operation, whose matrix representation is given by equation 2a and whose polynomial representation is given by equation 2b. In general, N-dimensional complex arithmetic can be represented by a polynomial product modulo $(z^N+1)$ and implemented according to the present technique using a negacyclic convolution matrix (Toeplitz matrix). Discrete Fourier Transforms and Fast Fourier Transforms can be represented by polynomial products modulo $(z^N-1)$ and implemented as a circular convolution matrix. Filtering and correlation operations can be represented as polynomial products and implemented using an aperiodic convolution matrix. The vector elements of the vector input operands according to the present technique correspond to the polynomial coefficients of the polynomial representations of the respective processing operations.

For a given signal processing operation, the operation can be represented as a polynomial product (modulo a polynomial). A matrix representation can be derived from the polynomial representation for implementation of the signal processing operation. The particular form of the matrix depends upon the type of operation involved and this matrix is used to perform the matrix-vector calculation during execution of the single program instruction by the decoder.

In so far as embodiments of the invention described above are implemented, at least in part, using software-controlled data processing apparatus, it will be appreciated that a computer program providing such software control and a transmission, storage or other medium by which such a computer program is provided are envisaged as aspects of the present invention.

Although illustrative embodiments of the invention have been described in detail herein with reference to the accompanying drawings, it is to be understood that the invention is not limited to those precise embodiments and that various changes and modifications can be effected therein by one skilled in the art without departing from the scope and spirit of the invention as defined by the appended claims.

I claim:

1. A data processing apparatus comprising:
   data processing logic configured to perform data processing operations specified by program instructions, said data processing logic comprising a plurality of functional units configured to execute in parallel, said data processing operations being performed on data received from a data source;
   a decoder, responsive to a single program instruction, configured to control said data processing logic to concurrently execute said single program instruction on each of a plurality of vector elements of each of a respective plurality of vector input operands received from said data source using said plurality of functional units;
   wherein during execution of said single program instruction, said plurality of functional units are configured to operate as a predetermined group on said plurality of vector elements to perform at least a matrix-vector calculation in which said matrix is an m×n non-identity matrix where m and n are integers greater than one, and entries of said matrix are one of:
   (i) populated in dependence upon at least one of said vector elements of at least one of said plurality of vector input operands; and
   (ii) generated within said data processing logic as an explicit function of said single program instruction.

2. Data processing apparatus according to claim 1, wherein said data processing logic is adapted to populate said non-identity matrix in dependence upon at least one and at most two of said plurality of vector input operands.

3. Data processing apparatus according to claim 1, wherein said data processing logic is adapted to process one of a permutation matrix, a circulant matrix or a Toeplitz matrix as said non-identity matrix.

4. Data processing apparatus according to claim 3, wherein said data processing logic is adapted to process either said circulant matrix or said Toeplitz matrix as said non-identity matrix and to populate entries of said non-identity matrix in dependence upon at least one of said vector elements of at least one of said plurality of vector input operands.

5. Data processing apparatus according to claim 3, wherein said data processing logic is adapted to process said permutation matrix as said non-identity matrix and to generate entries of said non-identity matrix within said data processing logic as an explicit function of said single program instruction.

6. Data processing apparatus according to claim 1, wherein said data processing logic is adapted to process said non-identity matrix associated with a polynomial product operation and to process said vector elements of said vector input operands corresponding to polynomial coefficients of polynomials of said polynomial product operation.

7. Data processing apparatus according to claim 1, wherein said data processing logic is adapted to process said non-identity matrix is associated with a polynomial product operation modulo a non-constant polynomial and to process said vector elements of said vector input operands corresponding to coefficients of polynomials of said polynomial product, and said non-constant polynomial is dependent upon said single program instruction.

8. Data processing apparatus according to claim 1, wherein said vector elements of said vector input operands are partitions of a representation in which a data word comprising a plurality of digits is represented by a vector input operand such that said plurality of digits are partitioned into at least two subsets corresponding to respective vector elements of said vector input operand.

9. Data processing apparatus according to claim 8, wherein said partitions are partitions of a multi-dimensional representation.

10. Data processing apparatus according to claim 8, wherein said partitions are partitions of a multi-precision representation.

11. Data processing apparatus according to claim 1, wherein said data processing logic is adapted to construct said non-identity matrix using Kronecker product rules such that it comprises a plurality of sub-matrices associated with a respective plurality of inner products.

12. Data processing apparatus according to claim 1, wherein said vector input operands are addressed using scalar addresses and wherein said vector input operands are transported within said data processing apparatus as complete entities.

13. Data processing apparatus according to claim 1, wherein said matrix has an associated matrix type specified implicitly by said single program instruction.

14. Data processing apparatus according to claim 1, wherein said matrix has an associated matrix type specified explicitly as an argument of said single program instruction.

15. Data processing apparatus according to claim 1, wherein said matrix has an associated matrix type specified in hardware by a currently-set programmable mode of operation of said data processing logic.

16. Data processing apparatus according to claim 1, wherein said matrix has an associated matrix type specified by a dedicated field of a machine-level version of said single program instruction.

17. Data processing apparatus according to claim 1, wherein said data processing logic is adapted to process an aperiodic convolution matrix or an asymmetric Toeplitz matrix as said non-identity matrix and said data processing logic is adapted to process said program instruction to be executed as one of a sequence of program instructions of an iterative computation and wherein said data processing logic comprises memory operable to store state information corresponding to at least one of said sequence of program instructions of said iterative computation for use in execution of said program instruction in a subsequent iteration of said iterative computation.

18. Data processing apparatus according to claim 17, wherein said data processing logic is adapted to populate entries of said aperiodic convolution matrix or elements of said asymmetric Toeplitz matrix in dependence upon at least one of said vector elements of at least one of said plurality of vector input operands.

19. Data processing apparatus according to claim 1, wherein said data processing logic is adapted to process an element-wise product of a Toeplitz matrix and a sign matrix as said non-identity matrix.

20. Data processing apparatus according to claim 18, wherein said data processing logic is adapted to populate entries of said non-identity matrix corresponding to said element-wise product of said Toeplitz matrix and said sign matrix in dependence upon at least one of said vector elements of at least one of said plurality of vector input operands.

21. Data processing apparatus according to claim 1, wherein said data processing logic is adapted to process an element-wise product of a permutation matrix and a sign matrix as said non-identity matrix.

22. Data processing apparatus according to claim 21, wherein said data processing logic is adapted to generate entries of said non-identity matrix corresponding to said element-wise product of said permutation matrix and said sign matrix within said data processing logic as an explicit function of said program instruction.

23. Data processing apparatus according to claim 3, wherein said data processing logic is adapted to process said Toeplitz matrix as said non-identity matrix and said Toeplitz matrix is processed as one of an aperiodic convolution matrix or a negacyclic convolution matrix.

24. Data processing apparatus according to claim 3, wherein said data processing logic is adapted to process said circulant matrix as said non-identity matrix and said circulant matrix is processed as one of a periodic convolution matrix or a cyclic convolution matrix.

25. Data processing apparatus according to claim 1, wherein said data source is a register file and said plurality of vector input operands are read from respective locations in said register file.

26. A data processing method, said method comprising the steps of:
   performing data processing operations specified by program instructions using data processing logic comprising a plurality of functional units configured to execute in parallel, said data processing operations being performed on data received from a data source;
   controlling said data processing logic using a decoder responsive to a single program instruction to concurrently execute said single program instruction on each of a plurality of vector elements of each of a respective plurality of vector input operands received from said data source using said plurality of functional units;
   using said plurality of functional units to operate as a predetermined group on said plurality of vector elements during execution of said single program instruction to perform at least a matrix-vector calculation in which said matrix is an m×n non-identity matrix, where m and n are integers greater than one, and entries of said matrix are one of:

(i) populated in dependence upon at least one of said vector elements of at least one of said plurality of vector input operands; and (ii) generated within said data processing logic as an explicit function of said single program instruction.

27. A computer program product carrying a computer program for controlling a data processing apparatus in accordance with the method of claim 26.

28. A data processing apparatus comprising:
   means for data processing operable to perform data processing operations specified by program instructions, said data processing logic comprising a plurality of means for performing computational functions configured to execute in parallel, said data processing operations being performed on data received from a data source;
   means for decoding responsive to a single program instruction to control said means for data processing to concurrently execute said single program instruction on each of a plurality of vector elements of each of a respective plurality of vector input operands received from said data source using said plurality of means for performing computational functions;
   wherein during execution of said single program instruction, said plurality of means for performing computational functions operate as a predetermined group on said plurality of vector elements to perform at least a matrix-vector calculation in which said matrix is an m×n non-identity matrix, where m and n are integers greater than one, and entries of said matrix are one of:

(i) populated in dependence upon at least one of said vector elements of at least one of said plurality of vector input operands; and (ii) generated within said data processing logic as an explicit function of said single program instruction.

* * * * *